United States Patent
Lin et al.

(10) Patent No.: US 9,797,160 B2
(45) Date of Patent: Oct. 24, 2017

(54) PULL HOLDER OF A COVERING CURTAIN

(71) Applicant: MACAUTO INDUSTRIAL CO., LTD., Tainan (TW)

(72) Inventors: Paul Lin, Tainan (TW); Hung-Ming Yen, Tainan (TW); Chun-Liang Lee, Tainan (TW); Chu-Yin Huang, Tainan (TW)

(73) Assignee: Macauto Industrial Co., Ltd., Tainan (TW)

( * ) Notice: Subject to any disclaimer, the term of this patent is extended or adjusted under 35 U.S.C. 154(b) by 0 days.

(21) Appl. No.: 15/193,207

(22) Filed: Jun. 27, 2016

(65) Prior Publication Data
US 2017/0030105 A1  Feb. 2, 2017

(30) Foreign Application Priority Data
Jul. 28, 2015 (TW) .............................. 104212088 U

(51) Int. Cl.
E05B 1/00 (2006.01)
B60R 5/04 (2006.01)
E05B 5/00 (2006.01)

(52) U.S. Cl.
CPC ............ E05B 1/0015 (2013.01); B60R 5/045 (2013.01); B60R 5/047 (2013.01); E05B 5/006 (2013.01)

(58) Field of Classification Search
CPC ....... E05B 1/0015; E05B 5/006; B60R 5/044; B60R 5/045; B60R 5/047; B60R 5/048
See application file for complete search history.

(56) References Cited

U.S. PATENT DOCUMENTS

| | | | | |
|---|---|---|---|---|
| 7,401,716 B2 * | 7/2008 | Svenson | ................. | B60R 5/045 224/42.32 |
| 8,414,049 B2 * | 4/2013 | Parker | ..................... | B60J 5/104 296/24.4 |
| 8,534,736 B1 * | 9/2013 | Whalen | ................... | B60R 5/045 296/37.14 |
| 8,936,304 B2 * | 1/2015 | Lin | ........................ | B60J 7/0015 160/265 |
| 2008/0216970 A1 * | 9/2008 | Lin | ........................ | B60J 1/205 160/262 |
| 2013/0153160 A1 * | 6/2013 | Lin | .......................... | E06B 9/42 160/267.1 |
| 2013/0186578 A1 * | 7/2013 | Lin | ........................ | B60J 7/0015 160/271 |
| 2015/0020981 A1 * | 1/2015 | Weissmann | ............ | B62D 25/12 160/273.1 |
| 2016/0339846 A1 * | 11/2016 | Villacres Mesias | .... | B60R 5/047 |
| 2016/0347254 A1 * | 12/2016 | Bathelier | ............... | B60R 5/045 |

* cited by examiner

Primary Examiner — Jeffrey O Brien
(74) Attorney, Agent, or Firm — Rosenberg, Klein & Lee

(57) ABSTRACT

A pull holder of a covering curtain has an annular handle, an enclosed hole surrounded by the handle, a pivot cover, and a torsion spring. The pivot cover is pivotally connected to the handle via a pivot rod portion. The pivot rod portion has a pivot rod and a position restricting flange radially formed on the pivot rod and disposed between a first pivot portion and a supporting portion of the handle and next to the supporting portion. The torsion spring is mounted around the pivot rod and disposed between the supporting portion and a connecting portion of the handle. Thus, the pivot rod of the pivot rod portion of the pivot cover does not axially slide relative to the handle. Accordingly, the pull holder does not disassemble and can be operated stably.

12 Claims, 5 Drawing Sheets

US 9,797,160 B2

PULL HOLDER OF A COVERING CURTAIN

BACKGROUND OF THE INVENTION

1. Field of the Invention

The present invention relates to a pull holder of a covering curtain, especially to a pull holder that is mounted on a side panel of a covering curtain of a vehicle, such that a user can hold the pull holder to pull a curtain fabric of the covering curtain.

2. Description of the Prior Art(s)

A covering curtain that is mounted in a trunk of a vehicle is used for shielding cargo in the trunk. A covering curtain comprises a curtain tube, a rolling device, a curtain fabric, a side rod, and a side panel. The rolling device is mounted in the curtain tube. The curtain fabric is rolled, is mounted in the curtain tube, and is connected to the rolling device. The curtain fabric has an outer edge disposed outside the curtain tube. The side rod is attached to the outer edge of the curtain fabric. The side panel is attached to the side rod. When the covering curtain is mounted in the trunk of the vehicle, two ends of the curtain tube are respectively secured to two opposite sidewalls of the vehicle and are disposed adjacent to rear seats of the vehicle.

As the curtain fabric is pulled out of the curtain tube toward a rear door of the vehicle and two ends of the side rod respectively engage to the sidewalls of the vehicle near the rear door, the rolling device tends to roll the curtain fabric backward, the curtain fabric is expanded, and the side panel is extended toward the rear door of the vehicle. Accordingly, the curtain fabric and the side panel cover the trunk of the vehicle. As the ends of the side rod disengage from the sidewalls of the vehicle, the rolling device rolls up the curtain fabric to retract the curtain fabric back into the curtain tube.

For the convenience of holding the side panel, a pull holder is mounted on the side panel and is disposed adjacent to a distal edge of the side panel. The pull holder is annular and has an enclosed hole for fingers of a user to protrude therethrough and to hold the pull holder. However, the enclosed hole of the pull holder causes deficiency of coverage on the covering curtain.

Thus, a conventional pull holder has an annular handle, an enclosed hole, a pivot cover, and a torsion spring. The enclosed hole is surrounded by the handle. The pivot cover is mounted in the enclosed hole, covers the enclosed hole, and has a pivot rod portion. The pivot portion is pivotally connected to the handle. The torsion spring is mounted around the pivot rod portion of the pivot cover and has two ends respectively connected to the pivot cover and the handle. When the fingers of the user protrude into the enclosed hole to hold the handle, the pivot cover is pushed open accordingly and the torsion spring is twisted. When the user releases the pull holder, the torsion spring pushes the pivot cover to pivot backward and to close the enclosed hole.

Nevertheless, since there is no position restricting structure between the handle and the pivot rod portion of the pivot cover, the pivot cover axially slides relative to the handle easily, causing the conventional pull holder to disassemble.

To overcome the shortcomings, the present invention provides a pull holder of a covering curtain to mitigate or obviate the aforementioned problems.

SUMMARY OF THE INVENTION

The main objective of the present invention is to provide a pull holder of a covering curtain. The pull holder has an annular handle, an enclosed hole surrounded by the handle, a pivot cover, and a torsion spring. The pivot cover is pivotally connected to the handle via a pivot rod portion. The pivot rod portion has a pivot rod and a position restricting flange radially formed on the pivot rod and disposed between a first pivot portion and a supporting portion of the handle and next to the supporting portion. The torsion spring is mounted around the pivot rod and disposed between the supporting portion and a connecting portion of the handle.

Thus, the pivot rod of the pivot rod portion of the pivot cover does not axially slide relative to the handle. Accordingly, the pull holder does not disassemble and can be operated stably.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
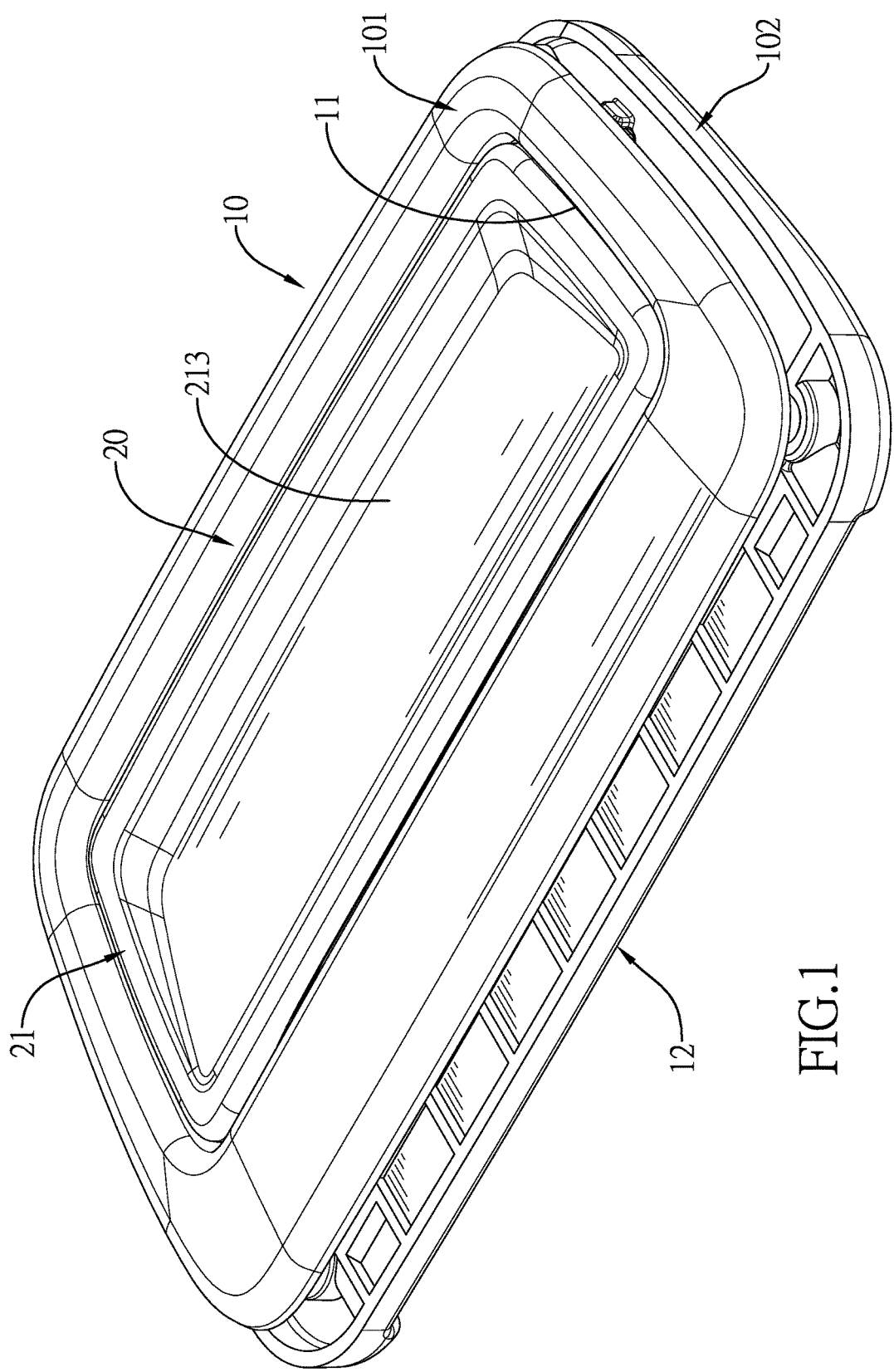
FIG. 1 is a perspective view of a pull holder of a covering curtain in accordance with the present invention.
Figure 2:
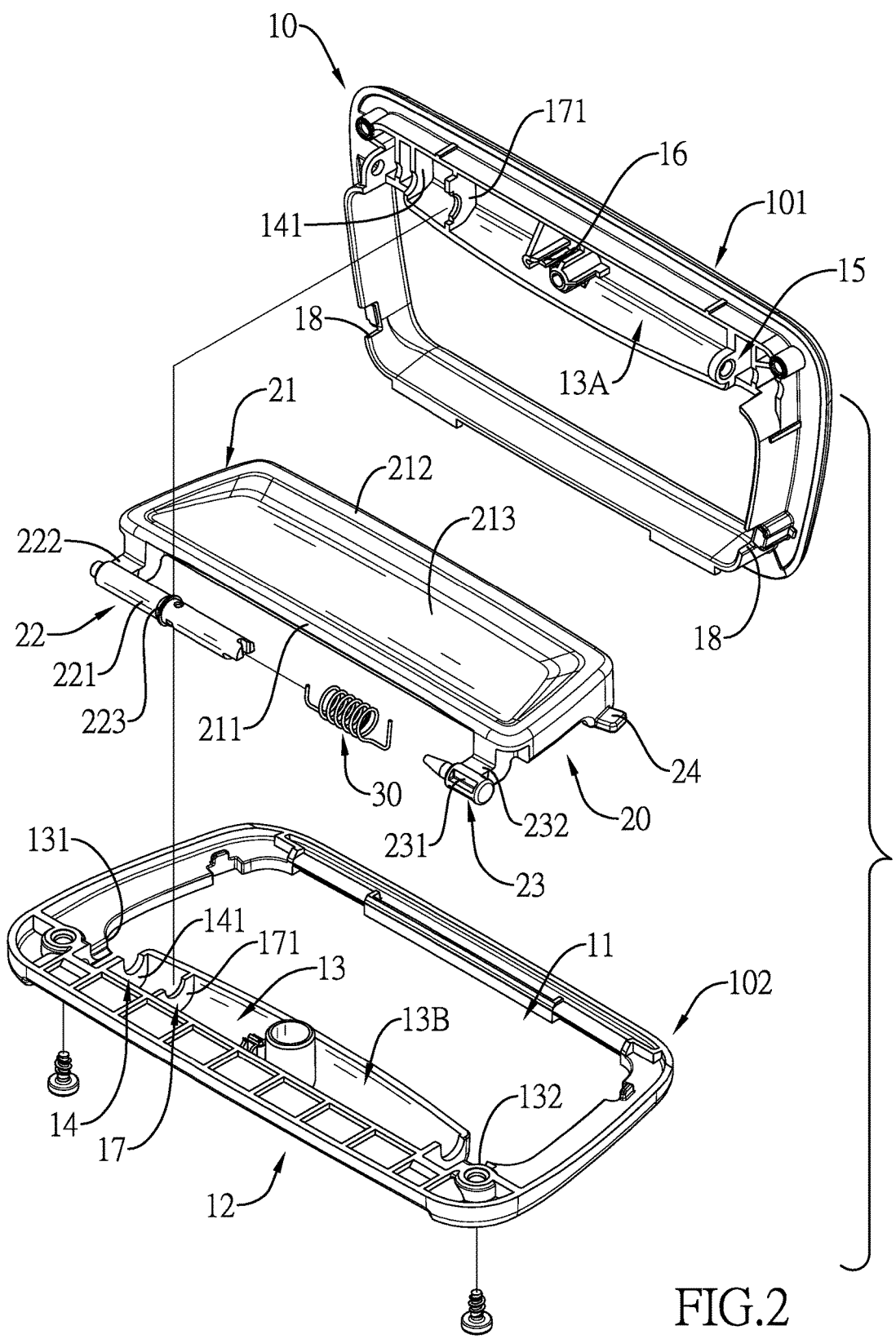
FIG. 2 is an exploded perspective view of the pull holder in FIG. 1.

With reference to FIGS. 1 and 2, a pull holder of a covering curtain in accordance with the present invention comprises a handle 10, an enclosed hole 11, a pivot cover 20, and a torsion spring 30.

As shown in FIG. 2, the handle 10 is annular and has a holding portion 12, an assembling chamber 13, a first pivot portion 14, a second pivot portion 15, a connecting portion 16, and a supporting portion 17. The holding portion 12 is formed on the handle 10. The assembling chamber 13 is formed in the holding portion 12 and has a first end portion and a second end portion. The first end portion and the second end portion are disposed opposite to each other. The first pivot portion 14 is formed in the first end portion of the assembling chamber 13. The second pivot portion 15 is formed on the second end portion of the assembling chamber 13. The connecting portion 16 is formed in the assembling chamber 13 and is disposed at a middle portion of the assembling chamber 13. The supporting portion 17 is formed in the assembling chamber 13 and is disposed between the first pivot portion 14 and the connecting portion 16.

The enclosed hole 11 is surrounded by the annular handle 10 and has a first mounting space 131 and a second mounting space 132. The first mounting space 131 is defined next to and communicates with the first end portion of the assembling chamber 13. The second mounting space 132 is defined next to and communicates with the second end portion of the assembling chamber 13.

Figure 3:
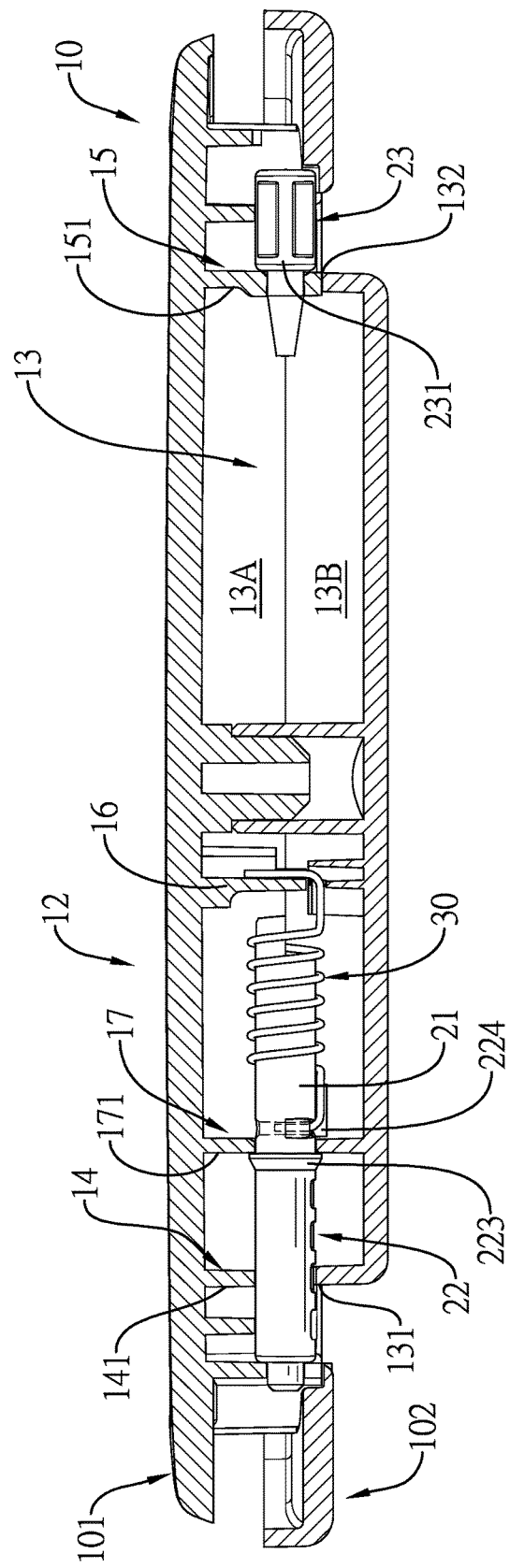
FIG. 3 is a side view in partial section of the pull holder in FIG. 1.

With further reference to FIGS. 2 and 3, in the preferred embodiment, the annular handle 10 is formed by attaching an annular upper half-housing 101 and an annular lower half-housing 102. A distal edge of a side panel of the covering curtain is securely held between the upper and lower half-housings 101, 102.

Preferably, the upper half-housing 101 and the lower half-housing 102 may be attached to each other by fastening means such as engaging, adhering, screwing, and the like. In the preferred embodiment, the upper half-housing 101 and the lower half-housing 102 are fastened to each other via multiple screws.

Furthermore, the assembling chamber 13 is formed by combining two compartments 13A, 13B. The two compartments 13A, 13B are respectively formed on the upper and lower half-housings 101, 102. The first pivot portion 14 is formed by attaching two pivot half-tabs 141. The two pivot half-tabs 141 are respectively formed in the compartments 13A, 13B of the upper and lower half-housings 101, 102. The second pivot portion 15 is formed as a pivot tab 151. The pivot tab 151 has a pivot hole formed through the pivot tab 151. The supporting portion 17 is formed by attaching two supporting half-tabs 171. The two supporting half-tabs 171 are respectively formed in the compartments 13A, 13B of the upper and lower half-housings 101, 102.

With reference to FIGS. 2 to 5, the pivot cover 20 is mounted in the enclosed hole 11, is pivotally connected to the holding portion 12 of the handle 10, and selectively covers the enclosed hole 11. The pivot cover 20 has a covering panel 21, a pivot rod portion 22, and a pivot bar portion 23.

The covering panel 21 corresponds in shape and size to the enclosed hole 11 and has a pivot side 211, a movable side 212, and a top surface 213. The movable side 212 is disposed opposite to the pivot side 211. The top surface 213 is recessed.

The pivot rod portion 22 is attached to the pivot side 211 of the covering panel 21 and has a pivot rod 221, a connector 222, and a position restricting flange 223. The pivot rod 221 is parallel to and is spaced apart from the pivot side 211 of the covering panel 21 and is pivotally mounted through the first pivot portion 14 and the supporting portion 17. The pivot rod 221 has a connection end and a free end. The connector 222 of the pivot rod portion 22 is connected to the pivot side 211 of the covering panel 21 and the connection end of the pivot rod 221 and is mounted in the first mounting space 131. The position restricting flange 223 is formed on and radially protrudes from the pivot rod 221, is disposed at a middle portion of the pivot rod 221, and is disposed between the first pivot portion 14 and the supporting portion 17 and next to the supporting portion 17. In the preferred embodiment, the position restricting flange 223 is annular.

The pivot bar portion 23 is attached to the pivot side 211 of the covering panel 21 and has a pivot bar 231 and a connector 232. The pivot bar 231 is parallel to and is spaced apart from the pivot side 211 of the covering panel 21, is coaxial with the pivot rod 221, and is pivotally mounted through the pivot tab 151 of the second pivot portion 15. The connector 232 of the pivot bar portion 23 is connected to the pivot side 211 of the covering panel 21 and an end of the pivot bar 231 and is mounted in the second mounting space 132.

Thus, the pivot cover 20 pivots on the pivot rod 221 and the pivot bar 231, so as to be in the enclosed hole 11 and cover the enclosed hole 11 or alternately depart from the enclosed hole 11.

Figure 4:
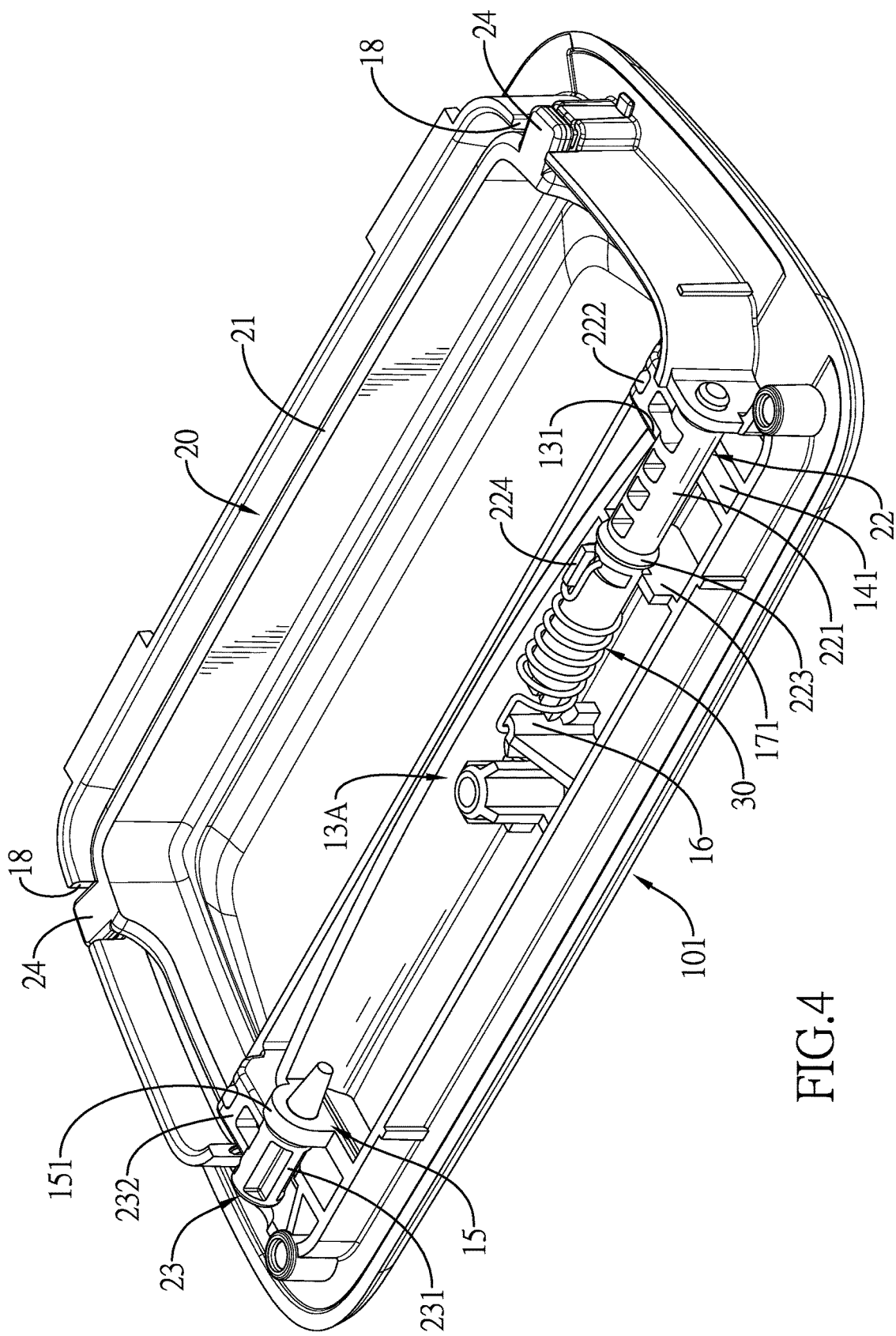
FIG. 4 is a perspective view of an upper half-housing, a pivot cover, and a torsion spring of the pull holder in FIG. 1, shown disposed upside down.
Figure 5:
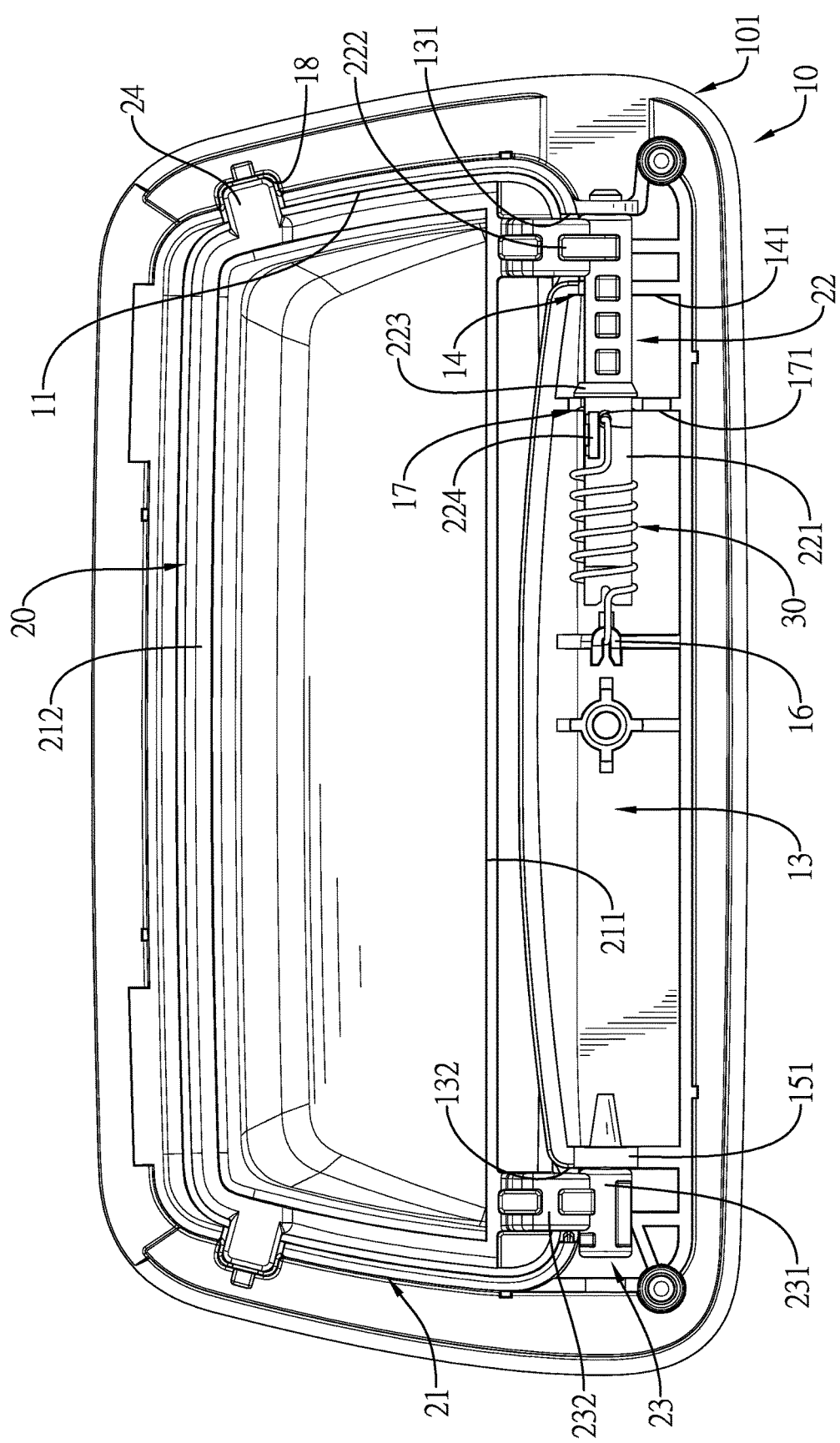
FIG. 5 is a bottom view of the upper half-housing, the pivot cover, and the torsion spring of the pull holder in FIG. 1.

As shown in FIGS. 3 to 5, in the preferred embodiment, the pivot rod portion 22 of the pivot cover 20 further has a limiting protrusion 224. The limiting protrusion 224 is formed on the pivot rod 221 and is spaced apart from the position restricting flange 223. The supporting portion 17 is disposed between the position restricting flange 223 and the limiting protrusion 224.

As shown in FIGS. 2 to 5, the torsion spring 30 is mounted around the free end of the pivot rod 221 and has two ends. One of the ends of the torsion spring 30 is securely connected to the connecting portion 16 of the handle 10 and the other end of the torsion spring 30 is securely connected to the pivot rod 221 and is disposed adjacent to the position restricting flange 223. When the pivot cover 20 pivots to depart from the enclosed hole 11, the torsion spring 30 is twisted and exerts a resilient force to push the pivot cover 20 to pivot backward to cover the enclosed hole 11.

As shown in FIGS. 2 and 4, in the preferred embodiment, the movable side 212 of the covering panel 21 has two opposite ends. The pivot cover 20 further has at least one engaging fin 24. The at least one engaging fin 24 is formed on at least one of the ends of the movable side 212 of the covering panel 21. The handle 10 further has an open-close portion. The open-close portion is disposed opposite to the holding portion 12 of the handle 10 and has a lower surface and at least one engaging recess 18. The at least one engaging recess 18 is separately formed in the lower surface of the open-close portion of the handle 10 and corresponds in position to the at least one engaging fin 24 of the pivot cover 20. When the pivot cover 20 covers the enclosed hole 11, the at least one engaging fin 24 of the pivot cover 20 engages in the at least one engaging recess 18 of the handle 10.

The pull holder that is mounted on the side panel of the covering curtain allows a user to expand or to retract a curtain fabric of the covering curtain by holding the pull holder. As shown in FIGS. 1 to 4, when a hand of the user holds the pull holder, fingers of the user push the pivot cover 20 to pivot. Thus, the pivot cover 20 pivots to depart from the enclosed hole 11 and abut against the holding portion 12 of the handle 10, and the hand of the user holds the holding portion 12 of the handle 10 and the covering panel 21 of the pivot cover 20. Meanwhile, the torsion spring 30 is twisted and the resilient force is formed.

When the user releases the pull holder, the torsion spring 30 exerts the resilient force to push the pivot cover 20 to pivot backward. As the pivot cover 20 covers the enclosed hole 11, the at least one engaging fin 24 of the pivot cover 20 engages in the at least one engaging recess 18 of the handle 10. The pivot cover 20 is mounted in the enclosed hole 11 that is surround by the handle 10 in a specific position.

The pull holder of the covering curtain as described has the following advantages. Since the position restricting flange 223 on the pivot rod 221 is disposed between the first pivot portion 14 and the supporting portion 17 and next to the supporting portion 17 and the torsion spring 30 around the pivot rod 221 is disposed between the connecting portion 16 and the supporting portion 17, the pivot rod 221 of the pivot rod portion 22 of the pivot cover 20 does not axially slide relative to the handle 10. Accordingly, the pull holder does not disassemble and can be operated stably.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pull holder of a covering curtain comprising:
a handle being annular and having
  a holding portion formed on the handle;
  an assembling chamber formed in the holding portion and having a first end portion;
  a first pivot portion formed in the first end portion of the assembling chamber;
  a connecting portion formed in the assembling chamber; and
  a supporting portion formed in the assembling chamber and disposed between the first pivot portion and the connecting portion;
an enclosed hole surrounded by the annular handle and having a first mounting space, and the first mounting space defined next to and communicating with the first end portion of the assembling chamber;
a pivot cover mounted in the enclosed hole, pivotally connected to the holding portion of the handle, and selectively covering the enclosed hole, and the pivot cover having
  a covering panel having
    a pivot side; and
    a movable side disposed opposite to the pivot side; and
  a pivot rod portion attached to the pivot side of the covering panel and having
    a pivot rod being parallel to and spaced apart from the pivot side of the covering panel, pivotally mounted through the first pivot portion and the supporting portion, and having a connection end and a free end;
    a connector connected to the pivot side of the covering panel and the connection end of the pivot rod and being mounted in the first mounting space; and
    a position restricting flange formed on and radially protruding from the pivot rod and disposed between the first pivot portion and the supporting portion and next to the supporting portion; and
a torsion spring mounted around the pivot rod and having two ends, and one of the ends of the torsion spring securely connected to the connecting portion of the handle and the other end of the torsion spring securely connected to the pivot rod and disposed adjacent to the position restricting flange;
wherein the pivot cover pivots on the pivot rod, so as to be in the enclosed hole and cover the enclosed hole or alternately depart from the enclosed hole; and
when the pivot cover pivots to depart from the enclosed hole, the torsion spring is twisted and exerts a resilient force to push the pivot cover to pivot backward.

2. The pull holder as claimed in claim 1, wherein the position restricting flange is annular.

3. The pull holder as claimed in claim 1, wherein
the pivot rod portion of the pivot cover further has a limiting protrusion, and the limiting protrusion is formed on the pivot rod and is spaced apart from the position restricting flange; and
the supporting portion is disposed between the position restricting flange and the limiting protrusion.

4. The pull holder as claimed in claim 2, wherein
the pivot rod portion of the pivot cover further has a limiting protrusion, and the limiting protrusion is formed on the pivot rod and is spaced apart from the position restricting flange; and
the supporting portion is disposed between the position restricting flange and the limiting protrusion.

5. The pull holder as claimed in claim 1, wherein
the handle is formed by attaching an annular upper half-housing and an annular lower half-housing, and the upper half-housing and the lower half-housing are attached to each other by screwing;
the assembling chamber of the handle further has a second end portion, and the second end portion is disposed opposite to the first end portion of the assembling chamber;
the handle further has a second pivot portion, and the second pivot portion is formed on the second end portion of the assembling chamber;
the enclosed hole further has a second mounting space, and the second mounting space is defined next to and communicates with the second end portion of the assembling chamber;
the pivot cover further has a pivot bar portion, and the pivot bar portion is attached to the pivot side of the covering panel and has
  a pivot bar being parallel to and spaced apart from the pivot side of the covering panel, being coaxial with the pivot rod, and pivotally mounted through the second pivot portion; and
  a connector connected to the pivot side of the covering panel and an end of the pivot bar and mounted in the second mounting space.

6. The pull holder as claimed in claim 2, wherein
the handle is formed by attaching an annular upper half-housing and an annular lower half-housing, and the upper half-housing and the lower half-housing are attached to each other by screwing;
the assembling chamber of the handle further has a second end portion, and the second end portion is disposed opposite to the first end portion of the assembling chamber;
the handle further has a second pivot portion, and the second pivot portion is formed on the second end portion of the assembling chamber;
the enclosed hole further has a second mounting space, and the second mounting space is defined next to and communicates with the second end portion of the assembling chamber;
the pivot cover further has a pivot bar portion, and the pivot bar portion is attached to the pivot side of the covering panel and has
  a pivot bar being parallel to and spaced apart from the pivot side of the covering panel, being coaxial with the pivot rod, and pivotally mounted through the second pivot portion; and
  a connector connected to the pivot side of the covering panel and an end of the pivot bar and mounted in the second mounting space.

7. The pull holder as claimed in claim 3, wherein
the handle is formed by attaching an annular upper half-housing and an annular lower half-housing, and the upper half-housing and the lower half-housing are attached to each other by screwing;
the assembling chamber of the handle further has a second end portion, and the second end portion is disposed opposite to the first end portion of the assembling chamber;
the handle further has a second pivot portion, and the second pivot portion is formed on the second end portion of the assembling chamber;

the enclosed hole further has a second mounting space, and the second mounting space is defined next to and communicates with the second end portion of the assembling chamber;

the pivot cover further has a pivot bar portion, and the pivot bar portion is attached to the pivot side of the covering panel and has
- a pivot bar being parallel to and spaced apart from the pivot side of the covering panel, being coaxial with the pivot rod, and pivotally mounted through the second pivot portion; and
- a connector connected to the pivot side of the covering panel and an end of the pivot bar and mounted in the second mounting space.

8. The pull holder as claimed in claim 4, wherein
the handle is formed by attaching an annular upper half-housing and an annular lower half-housing, and the upper half-housing and the lower half-housing are attached to each other by screwing;

the assembling chamber of the handle further has a second end portion, and the second end portion is disposed opposite to the first end portion of the assembling chamber;

the handle further has a second pivot portion, and the second pivot portion is formed on the second end portion of the assembling chamber;

the enclosed hole further has a second mounting space, and the second mounting space is defined next to and communicates with the second end portion of the assembling chamber;

the pivot cover further has a pivot bar portion, and the pivot bar portion is attached to the pivot side of the covering panel and has
- a pivot bar being parallel to and spaced apart from the pivot side of the covering panel, being coaxial with the pivot rod, and pivotally mounted through the second pivot portion; and
- a connector connected to the pivot side of the covering panel and an end of the pivot bar and mounted in the second mounting space.

9. The pull holder as claimed in claim 5, wherein
the movable side of the covering panel has two opposite ends;

the pivot cover further has at least one engaging fin, and the at least one engaging fin is formed on at least one of the ends of the movable side of the covering panel; and the handle further has an open-close portion, and the open-close portion is disposed opposite to the holding portion of the handle and has
- a lower surface; and
- at least one engaging recess separately formed in the lower surface of the open-close portion of the handle and corresponding in position to the at least one engaging fin of the pivot cover;

wherein when the pivot cover covers the enclosed hole, the at least one engaging fin of the pivot cover engages in the at least one engaging recess of the handle.

10. The pull holder as claimed in claim 6, wherein
the movable side of the covering panel has two opposite ends;

the pivot cover further has at least one engaging fin, and the at least one engaging fin is formed on at least one of the ends of the movable side of the covering panel; and the handle further has an open-close portion, and the open-close portion is disposed opposite to the holding portion of the handle and has
- a lower surface; and
- at least one engaging recess separately formed in the lower surface of the open-close portion of the handle and corresponding in position to the at least one engaging fin of the pivot cover;

wherein when the pivot cover covers the enclosed hole, the at least one engaging fin of the pivot cover engages in the at least one engaging recess of the handle.

11. The pull holder as claimed in claim 7, wherein
the movable side of the covering panel has two opposite ends;

the pivot cover further has at least one engaging fin, and the at least one engaging fin is formed on at least one of the ends of the movable side of the covering panel; and the handle further has an open-close portion, and the open-close portion is disposed opposite to the holding portion of the handle and has
- a lower surface; and
- at least one engaging recess separately formed in the lower surface of the open-close portion of the handle and corresponding in position to the at least one engaging fin of the pivot cover;

wherein when the pivot cover covers the enclosed hole, the at least one engaging fin of the pivot cover engages in the at least one engaging recess of the handle.

12. The pull holder as claimed in claim 8, wherein
the movable side of the covering panel has two opposite ends;

the pivot cover further has at least one engaging fin, and the at least one engaging fin is formed on at least one of the ends of the movable side of the covering panel; and the handle further has an open-close portion, and the open-close portion is disposed opposite to the holding portion of the handle and has
- a lower surface; and
- at least one engaging recess separately formed in the lower surface of the open-close portion of the handle and corresponding in position to the at least one engaging fin of the pivot cover;

wherein when the pivot cover covers the enclosed hole, the at least one engaging fin of the pivot cover engages in the at least one engaging recess of the handle.

* * * * *